(12) United States Patent
Blank et al.

(10) Patent No.: US 10,900,807 B2
(45) Date of Patent: Jan. 26, 2021

(54) METHOD FOR THE SECURE OPERATION OF AN ELECTRONIC CONSUMPTION DATA MODULE AND CONSUMPTION DATA MODULE

(71) Applicant: DIEHL METERING SYSTEMS GMBH, Nuremberg (DE)

(72) Inventors: Thomas Blank, Merkendorf (DE); Petra Joppich-Dohlus, Rathsberg (DE); Stefan Schmitz, Nuremberg (DE); Achim Schmidt, Weissenohe (DE); Christian Jambor, Nuremberg (DE)

(73) Assignee: Diehl Metering Systems GmbH, Nuremberg (DE)

( * ) Notice: Subject to any disclaimer, the term of this patent is extended or adjusted under 35 U.S.C. 154(b) by 0 days.

(21) Appl. No.: 16/255,906

(22) Filed: Jan. 24, 2019

(65) Prior Publication Data
US 2019/0242723 A1  Aug. 8, 2019

(30) Foreign Application Priority Data

Feb. 3, 2018  (DE) ................. 10 2018 000 889
Apr. 14, 2018  (DE) ................. 10 2018 003 061

(51) Int. Cl.
*G01D 4/00* (2006.01)
*H04Q 9/00* (2006.01)
(Continued)

(52) U.S. Cl.
CPC ......... *G01D 4/004* (2013.01); *G06F 16/1734* (2019.01); *H04L 63/068* (2013.01);
(Continued)

(58) Field of Classification Search
CPC ...... G01D 4/004; G01D 4/002; H04L 63/068; H04L 63/0869; H04L 9/3273; H04Q 2209/60; H04Q 9/00; Y04S 40/24
See application file for complete search history.

(56) References Cited

U.S. PATENT DOCUMENTS

2011/0224935 A1*  9/2011 Hampel ............... G01D 4/004
                                                  702/85
2012/0078548 A1*  3/2012 Salazar ................. G01D 4/02
                                                  702/62
(Continued)

FOREIGN PATENT DOCUMENTS

DE    102008058264 A1    7/2010
DE    102012203518 A1    9/2013
(Continued)

*Primary Examiner* — Mirza F Alam
(74) *Attorney, Agent, or Firm* — Laurence A. Greenberg; Werner H. Stemer; Ralph E. Locher

(57) ABSTRACT

A method for operating an electronic consumption data module. Consumption data are transmitted via a communication system to a receiver, and different keys are provided for different software authorizations. Command authorizations are defined as software authorizations in the consumption data module. A consumption data module has a memory, a control and/or regulating unit, and a communication device for the consumption data transmission. Different keys are provided for different software authorizations, and the command authorizations are defined as software authorizations in the consumption data module. The consumption data module is operable by the method.

21 Claims, 3 Drawing Sheets

(51) Int. Cl.
*H04L 29/06* (2006.01)
*G06F 16/17* (2019.01)
*H04W 12/04* (2009.01)

(52) U.S. Cl.
CPC ........ *H04Q 9/00* (2013.01); *H04W 12/04071* (2019.01); *H04Q 2209/30* (2013.01); *H04Q 2209/40* (2013.01); *H04Q 2209/60* (2013.01)

(56) References Cited

U.S. PATENT DOCUMENTS

| | | | | |
|---|---|---|---|---|
| 2012/0116602 | A1* | 5/2012 | Vaswani | G06F 21/33 |
| | | | | 700/295 |
| 2013/0293390 | A1* | 11/2013 | Le Buhan | G01D 4/004 |
| | | | | 340/870.02 |
| 2014/0375474 | A1 | 12/2014 | Dietrich et al. | |
| 2015/0215346 | A1* | 7/2015 | Kotecha | H04L 67/141 |
| | | | | 709/227 |
| 2016/0098915 | A1* | 4/2016 | Phatak | G06F 21/34 |
| | | | | 340/538 |

FOREIGN PATENT DOCUMENTS

| | | |
|---|---|---|
| DE | 102012008519 A1 | 11/2013 |
| DE | 102015107210 A1 | 11/2016 |
| DE | 102015213602 A1 | 1/2017 |
| WO | 2017114613 A1 | 7/2017 |

\* cited by examiner

METHOD FOR THE SECURE OPERATION OF AN ELECTRONIC CONSUMPTION DATA MODULE AND CONSUMPTION DATA MODULE

CROSS-REFERENCE TO RELATED APPLICATION

This application claims the priority, under 35 U.S.C. § 119, of German application DE 10 2018 000 889.5, filed Feb. 3, 2018 and DE 10 2018 003 061.0, filed Apr. 14, 2018; the prior applications are herewith incorporated by reference in their entireties.

BACKGROUND OF THE INVENTION

Field of the Invention

The present invention relates to a method for operating an electronic consumption data module. The present invention furthermore relates to a consumption data module.

Data transmission from metering units, such as e.g. sensors, consumption meters or components of smart home controllers, is becoming increasingly important in everyday use. One important field of application of metering units is the use of intelligent consumption meters, also known as smart meters. These are normally consumption meters incorporated into a supply network, e.g. for energy, power, gas or water, which indicate actual consumption to the respective connection user and use a communication network to transmit the consumption data to the provider. Intelligent consumption meters offer the advantage that manual meter readings are no longer required and shorter-term billing can be implemented by the provider according to actual consumption. Shorter-term reading intervals in turn enable a more accurate linkage between end customer tariffs and the development of trading prices for electricity. The supply networks can also be substantially more effectively utilized.

Generic consumption meters normally transmit the accrued data in the form of data packets or data messages via a radio communication link, for example in the short range devices (SRD) or industrial, scientific, medical (ISM) frequency range. Data messages are normally made up of a plurality of data packets. The SRD or ISM frequency ranges offer the advantage that they are licence-free and only a general permit from the frequency authority is required for use.

Electronic consumption meters with a radio transmitter for wireless data transmission are frequently used for walk-in, walk-by, drive-by or fly-by reading. For this purpose, the metering devices are read by a mobile radio receiver by customer service personnel from a vehicle (drive-by) or on foot (walk-by) without having to enter the building. In the case of intelligent consumption meters, energy consumption, on the one hand, since these meters are mainly battery-controlled and are intended to have the longest possible maintenance intervals, and operational reliability, on the other hand, are of decisive importance. In the above-mentioned reading methods, radio messages are frequently transmitted throughout the entire year, the messages being very short in order to save energy so that a frequent transmission over a long time period is possible.

Intelligent metering infrastructures are increasingly used to record consumption data. In these metering infrastructures (consumption data recording systems), the consumption meters represent the terminal devices by means of which consumption data are captured at the metering points. The metering data are transmitted digitally from the consumption meters to a higher-level management system or head-end system. The head-end system manages the consumption data and communicates with the consumption meters. An intelligent metering infrastructure can comprise a large number of consumption meters. A simultaneous direct communication connection from all consumption meters to the head-end system is therefore often not possible as sufficient communication means are not available or the transmission bandwidths are too narrow. Data-collecting apparatuses, referred to as data collectors, are used so that the data recorded and transmitted by the consumption meters can nevertheless be transmitted as reliably and loss-free as possible to the head-end system. The data collectors are arranged in the communication path between the consumption meters and the head-end system. They collect the consumption data transmitted by the consumption meters on a communication path and act as buffer memories until the consumption data stored by them are retrieved by the head-end system. The data collectors can furthermore perform additional tasks, such as, for example, carrying out status queries in the consumption meters and providing the consumption meters with information and program codes, such as, for example, firmware and software updates and communication schedules. The consumption meters can be configured in this metering infrastructure via a radio communication link using a radio key.

In published, non-prosecuted German patent application DE 10 2015 107 210 A1, a method and an interface device are described for transmitting metering values from a consumption amount meter via a radio interface in which different coupling keys or reading keys are provided for different user profiles. Different access authorizations can be allocated to the user profiles in the interface device. However, the user profiles only grant different read rights in respect of the consumption quantity meter. Write permissions or configuration facilities are not provided. The determination of a new coupling key is furthermore described.

SUMMARY OF THE INVENTION

The object of the present invention is to provide a novel method for operating a consumption data module, and also a consumption data module, in which an increased operational flexibility with reduced maintenance intensity is enabled simultaneously with an advantageous energy efficiency.

According to the invention, a method is provided for operating an electronic consumption data module. The consumption data are transmitted to a receiver and different keys are provided for different software authorizations, wherein command authorizations are defined in a characterizing manner as software authorizations in the consumption data module.

In encryption technology or in cryptography, a key is a variable value which is used with an algorithm, for example in order to encrypt or decrypt a character string. Keys and/or certificates are furthermore used for authentication, validation and/or control of privileged access. The keys that are used may, for example, be keys of an asymmetric encryption method, such as, for example, the RSA method. The RSA method can be used for encryption and/or for digital signing. A key pair which consists of a private key and a public key is used here. Data can be decrypted and/or signed with the private key, whereas data can be encrypted and/or signatures can be verified with the public key. The private key is kept secret for this purpose. A key may therefore also be a key pair.

If the command authorizations are defined by the software authorizations in the consumption data module, the user can only execute commands within the limits of his authorizations. Commands may, for example, be read requests, so that e.g. the network provider is given read access to more detailed data than the end consumer. For commands with write requests for configuration values, in particular for metrological characteristics, it is of particularly great importance in terms of security to verify the relevant software authorizations in the consumption data module before said commands are executed.

The method is advantageously suitable for battery-operated, preferably long-term-battery-operated consumption data modules. The implementation of different software authorizations on a battery-operated system, in particular on an embedded system, presents a particular challenge due to the limited facilities of the consumption data module. There is advantageously no resulting increase in the energy consumption in the consumption data module due to the method.

The facility expediently exists to protect the metrological characteristics of the consumption data module by a software authorization.

The metrological characteristics can expediently comprise the following characteristics individually or in combination: gauging, calibration and/or adjustment. Consumption meters normally have a metrological unit which records the flow rate of the medium, e.g. water, power or gas and outputs a value for the flow rate according to its calibration. Calibration designates the determination of the relationship between the output values of the metrological unit and the associated values of a metered quantity defined by normals under predefined conditions. A normal is a metrological reference item, a reference material or a precise metering device which serves to calibrate other metering devices. Normals with the highest accuracy are referred to as primary normals which, according to the internationally valid definition, are affected by the lowest possible uncertainty according to the current prior art. As a result, units of the international system of units (Sc) are uniformly available worldwide and thus form the legally binding basis in legal metrology for the corresponding physical quantity. Consumption meters or their metrological units are calibrated in order to ensure compliance with legal requirements in commercial transactions. Calibration is the checking prescribed by the legislator for compliance with the fundamental legal calibration regulations, such as e.g. the calibration error limits. Calibrations are carried out in the Federal Republic of Germany by the calibration offices and state-recognized inspection bodies. A calibration is therefore a legally prescribed calibration of the metering device which can be referenced against national standards. In the adjustment, an intervention is performed on the consumption data module in order to set the latter to target values. The target values are predefined by means of a normal. A matching is performed on the consumption data module, for example via an adjustment screw or via electrical adjustment facilities. The adjustment therefore represents a permanent intervention in the consumption data module.

The metrological characteristics of the consumption data module can advantageously be stored in a metrological unit in the consumption data module. This metrological unit can be protected by corresponding hardware device security and is, for example, sealed by the calibration office. Access to the metrological characteristics of the consumption data module is advantageously no longer protected exclusively by a corresponding hardware device security, but can furthermore be regulated by software authorizations. It is furthermore also expediently possible to differentiate between individual users of the consumption data recording device through software authorizations. Possible user groups are e.g., the end consumer, the metering point operator, the network provider, the technical service, the manufacturer and/or the calibration authority.

It is particularly expedient if the software authorizations comprise write permissions. This offers the facility to define the write permissions individually for each user. The end consumer is expediently granted, for example, no write permissions in respect of the consumption data module, but only read rights. Write permissions can be granted to the metering point operator, the network provider, the technical service and/or the calibration authority, wherein these write permissions may in turn be configured with differing scope. Write permissions for less critical functions, such as e.g. the setting of the transmission intervals for the consumption data, can be granted to a plurality of user groups. Conversely, critical functions, such as, for example, the allocation of software authorizations to users, are reserved for highly trusted user groups only. The manufacturer, for example, and/or the calibration authority can be cited as trusted user groups. Access to the metrological characteristics of the consumption data module is expediently available to the trusted user groups only.

A radio communication system, a wired and/or an optical communication system is/are expediently provided as a communication system. The use of software authorizations is not restricted by the communication system type. The key for a specific authorization, such as, for example, the clearing of alarms, is independent from the communication system and can therefore be used via any given communication interface. An optical communication system can be provided e.g., for local communications, i.e. communications directly on the consumption data module. A radio communication system and/or a wired system, such as, for example, an M-bus interface, can be used for remote access to the consumption data module. Heightened security requirements can be imposed on the consumption data module through the remote access facility via a radio link, e.g. via wireless M-Bus. The use of radio keys to secure transmissions via a radio link is known. However, the known radio keys offer no separate protection for the data transmitted via a radio link or the configuration data themselves. Furthermore, commands to be executed in the consumption data module are not specifically authorized, so that, with knowledge of the radio key, all data and every command can generally be accessed in the consumption data module.

At least one key can advantageously be used to secure the radio transmission. The need for a separate radio key can thus be eliminated. The authorization for the radio transmission can be provided e.g. by the corresponding key for the software authorizations. The key for securing the radio transmission can be distinguished from known radio keys since it regulates not only access via a radio link, but also internal access to different functions or lower hierarchical levels.

At least one key for the software authorizations can also be expediently used to secure the data or configuration data during the radio transmission. Configuration data designate any type of data which are generated and managed by an application. Configuration data may comprise, for example, profiles, user data, settings, status and/or logs. The key be used, for example, for the coding and decoding of a cryptographic encryption method.

At least one key for the software access authorization can be notified selectively to an information recipient. The information recipient can advantageously be a highly trusted party. It is particularly appropriate if the key for the software access authorization in respect of the metrological characteristics is known to the relevant calibration authority and/or a comparable neutral body. Alternatively, it is also possible for the key for the software access authorization in respect of the metrological characteristics to be known exclusively to the relevant calibration authority and/or a comparable neutral body. The legal compliance of the calibration in the consumption data module can thus be guaranteed in a simple manner.

If a command is transmitted to the consumption data module without a key providing authorization for this command, the command is expediently not executed. It is thereby ensured that only commands originating from a trusted source are executable.

The consumption data module can advantageously generate an error signal in the event of an unauthorized command. If, for example, the metrological characteristics of the consumption data module are accessed with a non-authorizing key, an error can be transmitted back with the message that no sufficient authorization has been provided.

A manipulation of the metrological data can be proven in a simple manner by recording and storing an unauthorized access to metrological data, particularly by storing it in a non-erasable memory. The non-erasable memory may, for example, be a calibration logbook. The unauthorized access to metrological data can be indicated by the consumption data module, for example by a symbol, e.g. a balance symbol, in the display and/or by a status bit in a radiotelegram from which the manipulation is recognizable, even after a long time, e.g. after one year.

The consumption data module can expediently have an individual identifier. The consumption data module can thereby be distinguished from other consumption data modules.

At least one key from the group of keys can advantageously be valid for a software authorization in the case of an individual identifier of a consumption data module. In the case of a different consumption data module with a different identifier, the key can have no validity so that no software authorizations are granted in respect of this second consumption data module by the key of the first consumption data module. The number of possible keys per consumption data module for software authorizations is not restricted.

In one design, for example, five individual keys can be provided per consumption data module. One of these keys could be used, for example, to secure the radio transmission, wherein four keys are used for software authorizations.

In the case of a frequently repeated transmission of consumption data with the same key, the key could be determined by an attacker by means of a sufficiently high number of intercepted consumption data. The validities of the keys for software authorizations can expediently be time-limited in order to prevent an attack on a key. It is furthermore possible, for example, for software authorizations to be granted to a key on different consumption data modules. The key valid for a plurality of consumption data modules could have a time-limited validity for this purpose so that the common key is periodically renewed, for example once a quarter. A common software authorization of this type could be a clock service.

Since the scope of the software authorization for a key is individually configurable, individually differing rights can easily be granted to different users or user groups on the consumption data module.

The consumption data module can expediently be a consumption meter or a consumption data radio module. A consumption data radio module may, for example, be a radio module which transmits meter data, in particular consumption data. Different keys are provided for different software authorizations in the consumption data radio module.

Secondarily, the present invention claims a consumption data module. The consumption data module according to the invention comprises a memory, a control and/or regulating unit and also communication means for the consumption data transmission. Different keys are furthermore provided for different software authorizations, wherein command authorizations are defined in a characterizing manner in the consumption data module as software authorizations and the consumption data module is operable, in particular, by a method according to at least one of the method claims.

The consumption data module can advantageously comprise a battery, preferably a battery designed for long-term operation. The consumption data module can thus be operated as an embedded system independently from an external energy source. A battery designed for long-term operation can expediently be used in order to guarantee that the system can be operated autonomously and, for example, in order to lengthen the necessary maintenance intervals.

The facility advantageously exists for the consumption data model to comprise a metrological metering unit to record the consumption data. The metrological metering unit can expediently be protected by a software authorization.

The metrological characteristics of the consumption data module can expediently be stored in the metrological metering unit. Known consumption data modules, such as e.g. consumption meters, protect access to the metrological metering unit by means of a hardware protection and/or a calibration seal. Access to the metrological metering unit can advantageously be protected according to the invention by means of a software protection. In addition to hardware access, for example, a facility for software access to the metrological characteristics of the consumption data module can be provided.

In one alternative design, access to the metrological metering unit can be protected exclusively by means of software protection. Hardware access can already be prevented e.g. through the manufacturing process, whereby, for example, a hardware encapsulation of the metrological metering unit takes place during production. In this design, the metrological characteristics and therefore the calibration of the consumption data module can be accessed only via a software authorization.

The consumption data module can expediently comprise a module for managing the keys for the software authorizations. This module can, for example, be connected downstream of the communication means and can therefore monitor and control access to the remaining modules of the consumption data module. Access to the memory, the control and/or regulating unit or the processor and also the metrological metering unit can thus e.g. be regulated. The module for managing the keys can preferably be configured as a hardware and/or software component.

The communication means can advantageously comprise radio communication devices, wired communication devices and/or optical communication devices.

The facility furthermore exists to use the keys to secure the radio transmission. Such keys can thus comprise the functions of radio or transport keys. Radio or transport keys serve primarily to protect the data transport via radio paths.

Alternatively or additionally, the facility exists to use the keys to secure the configuration data. Access to these data in a consumption data module can advantageously be regulated and managed via the keys for the software authorization. Read and/or write permissions, for example, in respect of specific configuration data can be granted or denied to a user or a user group.

The facility expediently exists to notify the key for the software access authorization selectively to an information recipient. Access by means of keys for the software authorization to the metrological metering unit of the consumption data module can expediently be granted to the relevant calibration authority and/or a comparable neutral body. Alternatively, access can be granted exclusively to the relevant calibration authority and/or a comparable neutral body.

The consumption data module can advantageously have an individual identifier. One consumption data module can be distinguished from other consumption data modules by the individual identifier. If the consumption data module jointly transmits its identifier during radio transmissions, the data originating from this consumption data module, in particular consumption data, can be allocated to the correct consumption data module. The identifier can be stored in the communication module, as a result of which outgoing radio transmissions can be provided with the identifier. In the case of received transmissions, a check can be carried out in the communication module, e.g. using the jointly transmitted identifier of the target consumption data module, to determine whether these messages are intended for the respective consumption data module. The facility furthermore exists for the key management module to check the jointly transmitted identifier for authorizations along with the key for the command authorization. If the key that is used is not authorized for the respective identifier of the consumption data module, the key can be identified as invalid and e.g., the command execution can be refused.

The security of the consumption data module can be increased in a simple manner by imposing a time limit on the validities of the keys for software authorizations. On expiry of the validity of a key, a new key can be generated, for example, in the consumption data module, for example in the key management module. An algorithm can be stored, for example, by means of which a new valid key can be calculated. The facility exists, for example, to generate a new key on the basis of the hitherto valid key. Additionally or alternatively, the facility exists, for example, to generate a new key outside the consumption data module, preferably in a secure environment. The key generated in this way outside the consumption data module can be transferred, for example, securely onto the consumption data module. This is subject to the condition that the instance outside the consumption data module has the necessary generation rights and/or the necessary access rights in the consumption data module to transmit the new key.

The scope of the software authorization for the key can advantageously be individually configurable. Information indicating which key has which authorizations, for example, can be stored in the key management module. The key management module can thus decide, for example, which requests, in particular command requests, are granted or refused.

The memory can expediently comprise a non-erasable memory. The non-erasable memory can be configured, for example, as a calibration logbook.

The consumption data module can advantageously be a consumption meter or consumption data radio module.

Other features which are considered as characteristic for the invention are set forth in the appended claims.

Although the invention is illustrated and described herein as embodied in a method for the secure operation of an electronic consumption data module and consumption data module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
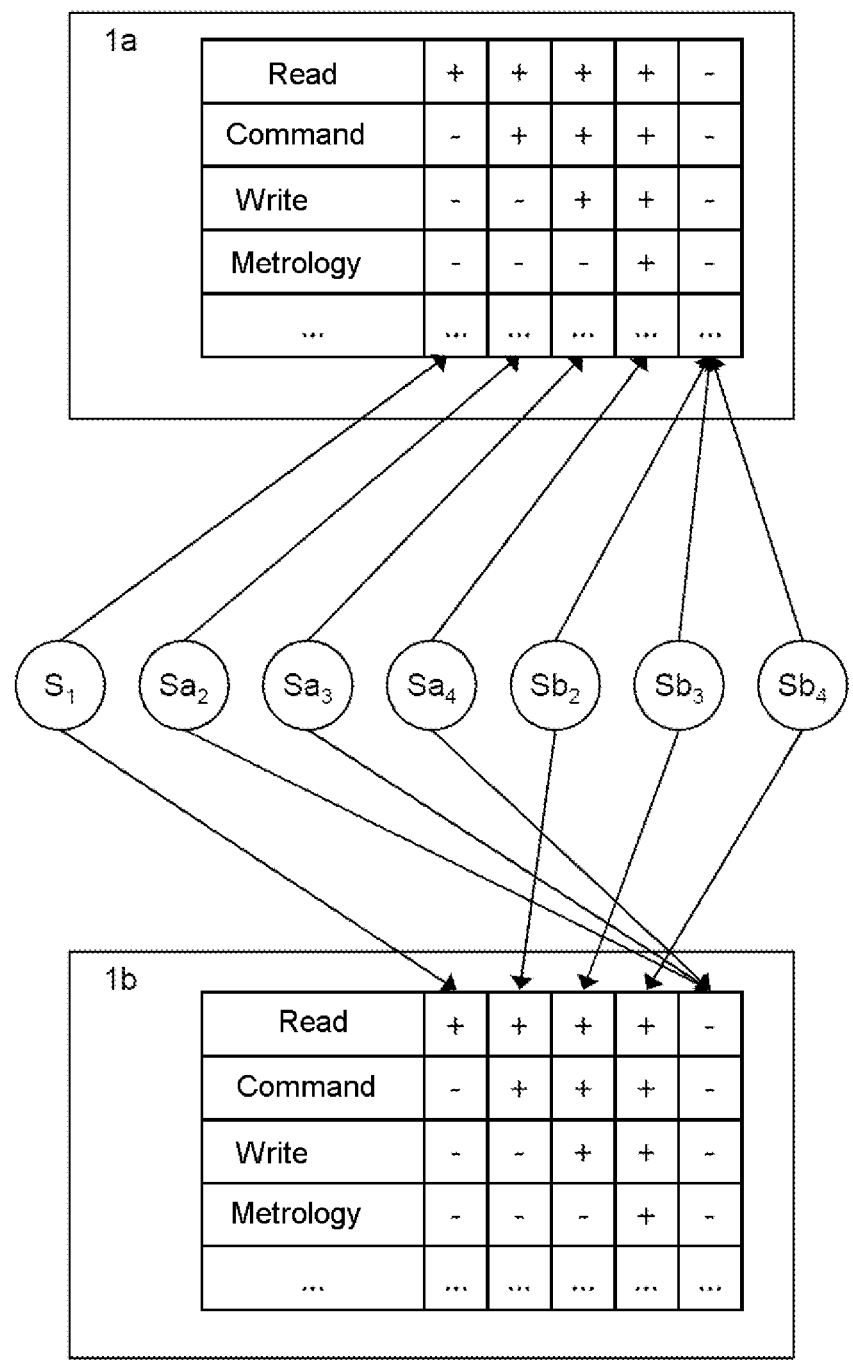
FIG. 1 is a simplified schematic representation of software authorizations in two consumption data modules according to the invention.

Referring now to the figures of the drawings in detail and first, particularly to FIG. 1 thereof, there is shown a simplified schematic representation of two designs of consumption data modules as consumption meters $1a$-$1b$ which have a plurality of different software authorizations. By way of example, the software authorizations are "read", "command", "write" and "metrology". "Read" stands for the read access to the data of the consumption meter $1a$ or $1b$. The readable data can comprise consumption data, configuration data and/or other consumption-meter-related data. The facility furthermore exists to configure further authorization levels within the read access to the consumption meters $1a$-$1b$. Only read access to the consumption data, for example, may be of interest to the end consumer. The end consumer could adjust his consumption on the basis of the consumption data in order to reduce his expenditure where possible. Conversely, read access to the configuration data of the consumption meter $1a$-$1b$ which could comprise, for example, the transmission intervals for transmission to a hierarchically superior data collector, may be of little interest to the end consumer, so that these rights cannot normally be granted to the end consumer.

The "command" software authorization relates to rights for the command authorization in the consumption meters $1a$-$1b$. The "write" software authorization relates to write access to the consumption meters $1a$-$1b$. Further authorization levels may exist within the write access rights. A write permission in the configuration data of the consumption meter $1a$-$1b$ may relate, for example, to the transmission intervals for the consumption data and/or the format of the consumption data themselves. In FIG. 1, "metrology" as a software authorization level relates to the access authorization in respect of the metrological characteristics of the consumption meter. The access rights can comprise read rights which permit, for example, the readout of the current calibration of the consumption meter. The access rights can furthermore comprise write permissions which allow, for example, changes to the calibration of the consumption meter. Such interventions in ongoing operation are the sole preserve of the relevant calibration authority and/or a comparable neutral body. The calibration authority can calibrate the consumption meter by adjusting the calibration.

The keys $S_1$ and $Sa_2$-$Sb_4$ authorize access to different functions in the consumption meters $1a$-$1b$. $S_1$ thus enables read access in both consumption meters $1a$ and $1b$. Since the consumption meters $1a$-$1b$ have individual identifiers and the authorizations of the keys $Sa_2$-$Sb_4$ are dependent on the individual identifier, the keys $Sa_2$-$Sa_4$ allow no read access in the second consumption meter $1b$. The keys $Sb_2$-$Sb_4$ similarly grant access to the second consumption meter $1b$ only and not to the first consumption meter $1a$. However, the keys $Sa_2$-$Sa_3$ additionally have command authorization rights or write permissions on the consumption meter $1a$, The key $S_1$ can be provided, for example, for an end consumer with a plurality of consumption meters, so that the end consumer can read out both consumption meters $1a$-$1b$ with one key $S_1$, The keys $Sa_2$ and $Sa_3$ or $Sb_2$ and $Sb_3$ can be provided on the basis of the command authorization rights or write permissions, e.g., for the metering point operator, the network provider, the technical service and/or the manufacturer. The keys $Sa_4$ and $Sb_4$ are equipped with the additional "metrology" right. The user with the key $Sa_4$ can, for example, modify the calibration of the metrological metering unit 13 of the consumption meter $1a$. This facility to intervene in the core systems of the consumption meter $1a$ is available to highly trusted users only. Only the relevant calibration office or a comparable neutral body is normally a trusted user of this type.

The keys $Sa_2$-$Sa_4$ thus grant access exclusively to functions of the first consumption meter $1a$, whereas the keys $Sb_2$-$Sb_4$ similarly enable access exclusively to functions of the second consumption meter $1b$. Conversely, the keys $Sa_2$ $Sa_4$ are excluded from access to the second consumption meter $1b$ and the keys $Sb_2$-$Sb_4$ are similarly excluded from access to the first consumption meter $1a$.

Figure 2:
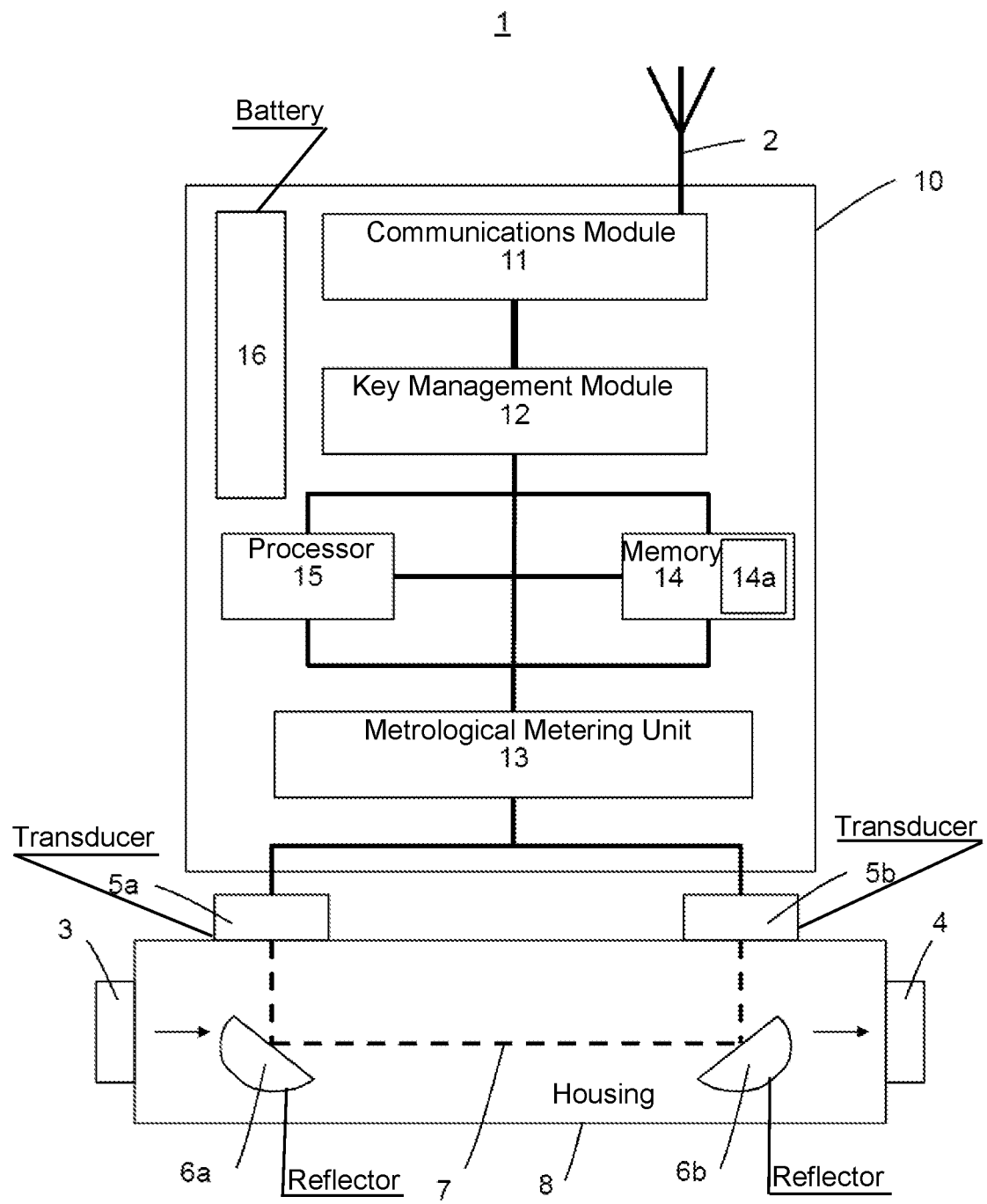
FIG. 2 is a highly simplified block diagram of one design of a consumption data module as a consumption meter, and also its components.

FIG. 2 shows a highly simplified block diagram of one design of the consumption data module as a consumption meter 1. The consumption meter 1 contains an electronic module 10 and a connection housing 8. The electronic module 10 in turn contains an antenna 2, a communication module 11, a key management module 12, a metrological metering unit 13, a memory 14, a processor 15 and a battery 16. The consumption meter 1 shown is a water meter configured as an ultrasonic flow meter. The ultrasonic metering path 7 is accommodated in the connection housing 8. The connection housing 8 has an input 3 and an output 4 for the water connection. The direction of flow of the flowing medium is indicated with the arrows at the input 3 and output 4. The metering device of the consumption meter 1 is shown by way of example with two ultrasonic transducers $5a$ and $5b$. The path of the ultrasonic signals is diverted on the reflectors $6a$ and $6b$ to a U-shaped metering path 7. One part of the metering path 7 runs parallel to the direction of flow of the flowing medium. The components in the electronic module 10 are coupled to the components of the connection housing 8 via the connection of the metrological metering unit 13 to the ultrasonic transducers $5a$, $5b$. The metrological metering unit 13 records the flow speed or the volume flow of the medium according to the calibration.

The key management module 12 is connected downstream of the communication module 11. Requests via a radio link are received by the communication module 11 and forwarded to the key management module 12. The key management module 12 monitors the keys or the authorizations of the requests which are made to the consumption meter 1. The memory 14 contains a non-erasable memory $14a$ which is designed here as a calibration log book. Unauthorized access to the metrological data or manipulations and manipulation attempts on the metrological data are noted and stored in this non-erasable memory $14a$.

Figure 3:
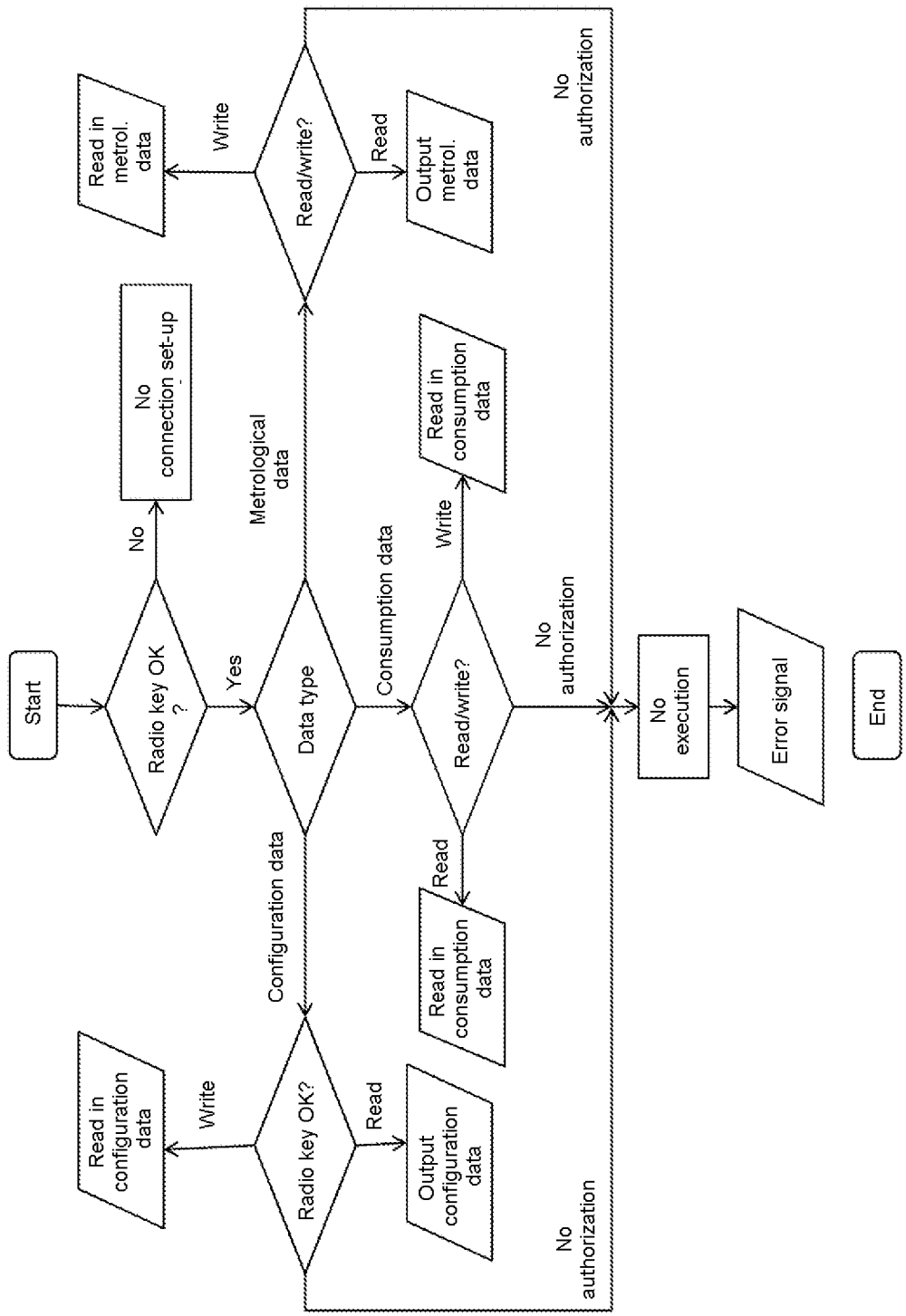
FIG. 3 is a flow diagram for the software authorizations in the consumption data module.

FIG. 3 shows a flow diagram for the software authorizations in one design of a consumption module as a consumption meter wherein different keys $S_{1-n}$ are used. On reception of a message via a radio link, the validity of the radio key is verified in the consumption meter 1 in a first step. If the key is already invalid, no connection is set up to the distant station. The radio key may simultaneously be a key $S_{1-n}$ for a software authorization. Depending on the type of data which are intended to be accessed in the consumption meter 1, a distinction is made, for example, between consumption data, configuration data and metrological data. Consumption data are, for example, the recorded consumptions, e.g. the consumed water volume in the case of a water meter. Configuration data may comprise, for example, settings for transmission intervals of the consumption data. Metrological data describe e.g. the calibration or gauging of the consumption meter. In a next step, read or write permissions for the selected data type are verified on the basis of the key $S_{1-n}$ used for the request. If read rights exist, the desired data are output; in the case of write permissions, the jointly transmitted data or commands are input. Conversely, if no authorization for the desired data type or insufficient read or write permissions exist, the request is not carried out. In this case, an error signal is then generated and transmitted back via a radio link.

The following is a summary list of reference numerals and the corresponding structure used in the above description of the invention:

1,1$a$,1$b$ Consumption data module
2 Antenna
3 Input
4 Output
5$a$, 5$b$ Ultrasonic transducer
6$a$, 6$b$ Reflector
7 Metering path
8 Connection housing
10 Electronic module
11 Communication module
12 Key management module
13 Metrological metering unit
14 Memory
14$a$ Non-erasable memory
15 Processor
16 Battery
$S_{1-n}$ Key
$S_1$ Key for read rights
$S_2$ Key for command authorizations
$S_3$ Key for write permissions
$S_4$ Key for metrological characteristics
$S_5$ Key for securing the radio transmission
$S_6$ Key for securing the configuration data

The invention claimed is:
1. A method for operating an electronic consumption data meter, configured as an ultra sonic flow meter, which comprises the steps of:
   transmitting consumption data via a communication system to a receiver;

providing different keys for different software authorizations of the electronic consumption data meter, wherein command authorizations are defined as the software authorizations in the electronic consumption data meter;

protecting metrological characteristics of the electronic consumption data meter by a software authorization, which have write permissions, and contain the following characteristics individually or in combination: gauging, calibration and/or adjustment, the write permissions of the software authorization allowing changes to a calibration of the electronic consumption data meter: and protecting the metrological characteristics disposed in a metrological metering unit by a hardware encapsulation so that the calibration of the electronic consumption data module is accessed only via the software authorization.

2. The method according to claim 1, which further comprises:

selecting the communication system from the group consisting of a radio communication system, a wired communication system and an optical communication system; and using at least one key to secure a radio transmission.

3. The method according to claim 1, which further comprises using at least one key to secure configuration data.

4. The method according to claim 1, wherein at least one key for software access authorization is notified selectively to an information recipient.

5. The method according to claim 1, wherein a command transmitted to the electronic consumption data meter without a key providing authorization for the command is not executable by the electronic consumption data meter, and the electronic consumption data meter generates an error signal in an event of an unauthorized command.

6. The method according to claim 1, which further comprises recording and storing an unauthorized access to metrological data.

7. The method according to claim 1, wherein the electronic consumption data meter has an individual identifier, and at least one key from a group of keys is valid for software authorization in a case of an individual identifier of the electronic consumption data meter.

8. The method according to claim 1, wherein validities of the keys for the software authorizations are time-limited.

9. The method according to claim 1, wherein a scope of the software authorization for a key is individually configurable.

10. The method according to claim 1, wherein the electronic consumption data meter is a consumption data radio meter.

11. A consumption data meter, configured as an ultra sonic flow meter, comprising:

a memory;

a control and/or regulating processor;

a metrological meter for recording consumption data;

a communication system fora consumption data transmission, and different keys are provided for different software authorizations;

ultrasonic transducers connected to said metrological meter;

command authorizations are defined as the software authorizations in the consumption data meter;

said metrological meter being protected by a software authorization, containing write permissions. wherein it is provided that metrological characteristics of the consumption data meter are stored in said metrological meter and contain at least one of the following characteristics: gauging, calibration and/or adjustment, the write permissions of the software authorization allowing changes to a calibration of the consumption data meter and said metrological meter being protected by a hardware encapsulation so that the calibration of the consumption data module is accessed only via the software authorization.

12. The consumption data meter according to claim 11, further comprising a battery.

13. The consumption data meter according to claim 11, further comprising a module for managing the keys for the software authorizations, said module configured as a hardware and/or software component.

14. The consumption data meter according to claim 11, wherein said communication system has radio communication means, a wired communication means and/or an optical communication means, and at least one key is used to secure a radio transmission.

15. The consumption data meter according to claims 11, wherein at least one of said keys is used to secure configuration data.

16. The consumption data meter according to claim 11, wherein at least one of said keys for a software access authorization is notified selectively to an information recipient.

17. The consumption data meter according to claim 11, further comprising an individual identifier.

18. The consumption data meter according to claim 11, wherein validities of the keys for the software authorizations are time-limited.

19. The consumption data meter according to claim 11, wherein a scope of a software authorization for a key is individually configurable.

20. The consumption data meter according to claim 11, wherein said memory has a non-erasable memory.

21. The consumption data meter according to claim 11, wherein the consumption data meter is a consumption data radio meter.

* * * * *